United States Patent

[11] 3,612,080

[72] Inventors Thomas E. Schneider, Jr.
c/o Tesco Chemicals, Inc., 445 Bishop St. N.W., Atlanta, Ga. 30318;
Marion R. Carstens; Homer J. Bates, c/o Georgia Institute of Technology, 225 North Ave., Atlanta, Ga. 30308
[21] Appl. No. 3,684
[22] Filed Jan. 19, 1970
[45] Patented Oct. 12, 1971
Continuation-in-part of application Ser. No. 754,535, Aug. 22, 1968, which is a continuation-in-part of application Ser. No. 579,253, Sept. 14, 1966, which is a continuation-in-part of application Ser. No. 403,698, Oct. 12, 1964, now Patent No. 3,323,539, dated June 6, 1967.

[54] CHEMICAL FEEDER
8 Claims, 5 Drawing Figs.
[52] U.S. Cl....................................................... 137/2,
137/268, 23/267, 23/272.6
[51] Int. Cl......................................................... B01d 11/02
[50] Field of Search........................................... 137/2, 268,
1, 575, 576; 23/272.6, 271, 267, 272, 267.5

[56] References Cited
UNITED STATES PATENTS

| | | | |
|---|---|---|---|
| 1,770,913 | 7/1930 | Kermor.................... | 137/575 X |
| 1,783,891 | 12/1930 | Thibert...................... | 137/575 X |
| 2,242,693 | 5/1941 | Benson....................... | 137/575 X |
| 2,387,945 | 10/1945 | McDow...................... | 137/268 X |
| 3,145,087 | 8/1964 | Walker........................ | 137/268 X |
| 3,164,443 | 1/1965 | Watson....................... | 23/271 |

Primary Examiner—M. Cary Nelson
Assistant Examiner—Robert J. Miller
Attorney—Jones & Thomas ABSTRACT: A chemical feeder for adding chemicals from a solid chemical compound into a body of water. The feeder includes a housing divided into upper and lower chambers, a tubular container positioned in the upper chamber for receiving a solidified chemical compound, a liquid inlet conduit communicating with the upper chamber, a liquid outlet conduit communicating with the lower chamber, valves controlling both conduits, and a float positioned in the lower chamber for operating both valves in response to the level of liquid in the lower chamber. The tubular container includes a plurality of apertures at spaced intervals about its lower end, and a nozzle extending inwardly from its lower end for flowing liquid from the upper chamber into contact with the solidified chemical compound to erode the compound. The mixture of liquid and eroded chemical compound then flows from the tubular container within the upper chamber to the lower chamber.

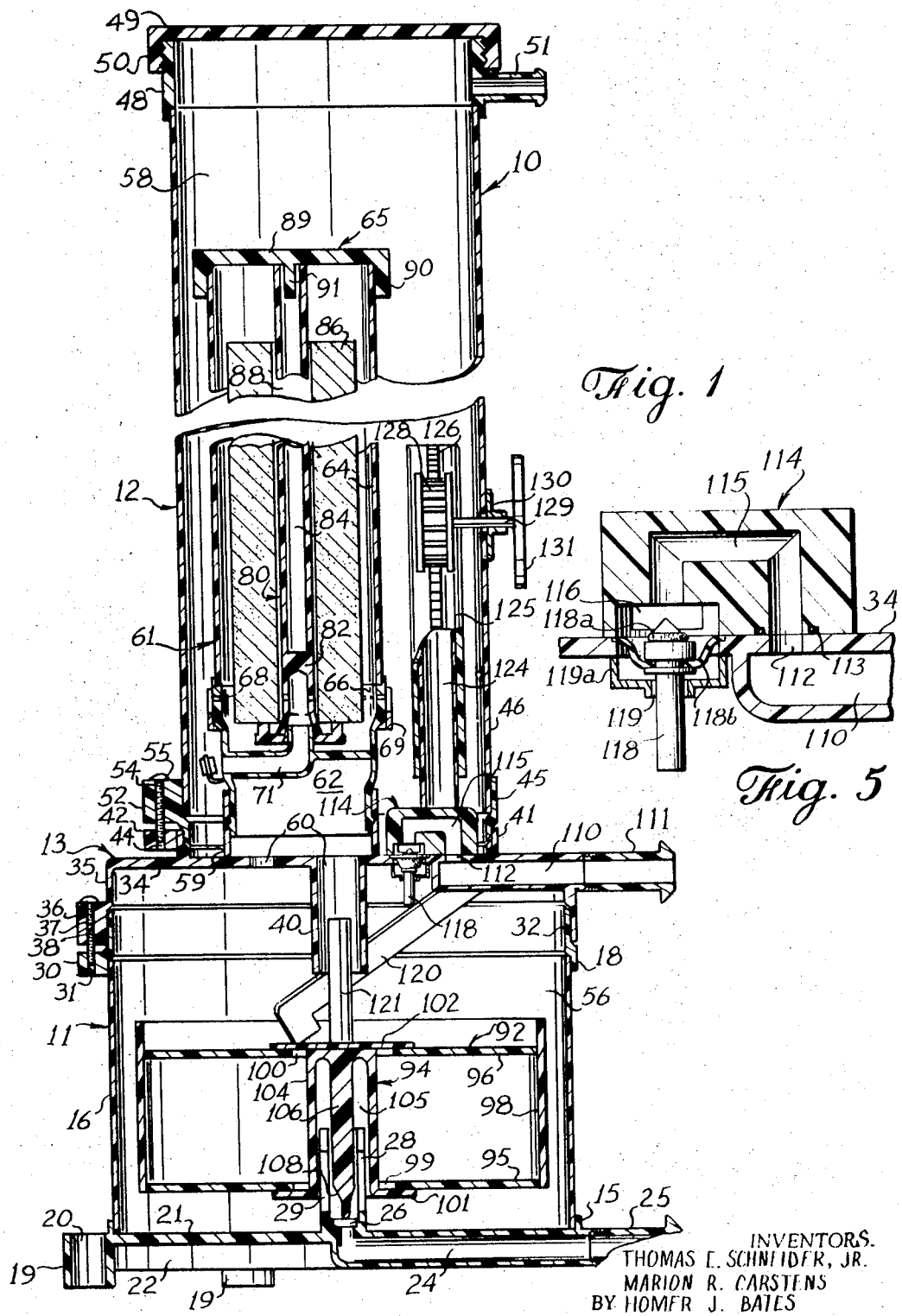

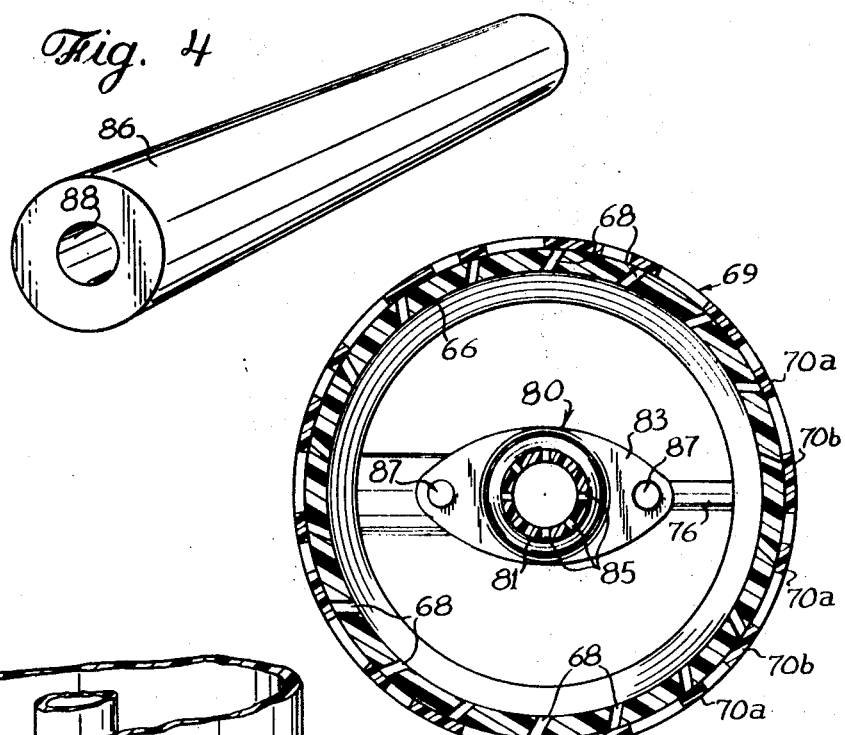
Fig. 4
Fig. 3
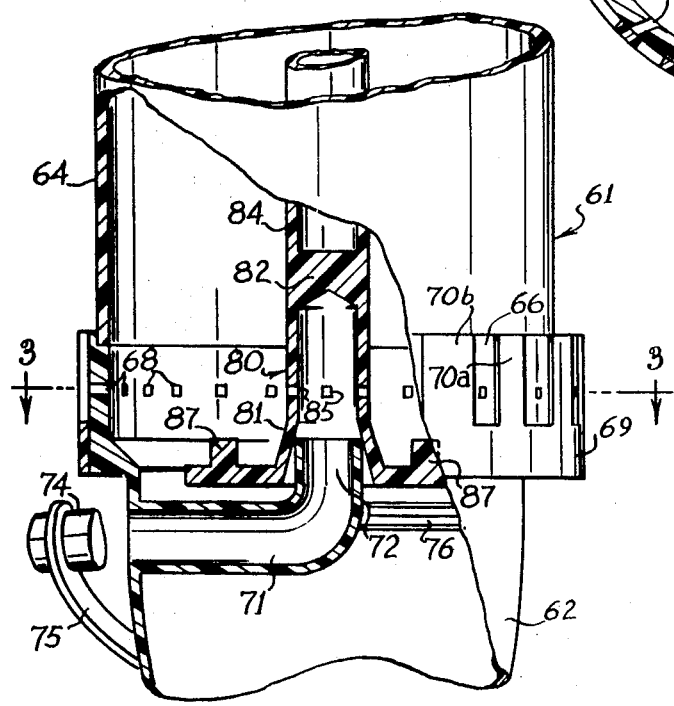
Fig. 2
INVENTORS
THOMAS E. SCHNEIDER, JR.
MARION R. CARSTENS
BY HOMER J. BATES
Jones & Thomas
ATTORNEYS

CHEMICAL FEEDER

CROSS-REFERENCE TO RELATED APPLICATIONS

This application is a continuation-in-part of our copending U.S. Pat. application Ser. No. 754,535, filed Aug. 22, 1968 which is in turn a continuation-in-part of our copending U.S. Pat. application Ser. No. 579,253 filed Sept. 14, 1966 which is in turn a continuation-in-part of our copending U.S. Pat. application Ser. No. 403,968 filed Oct. 12, 1964 now U.S. Pat. No. 3,323,539, issued June 6, 1967.

When mixing soluble chemicals with liquids it is usually desirable to continuously mix the chemical at a controlled rate with the liquid so that the resulting mixture has an appropriate concentration of chemical in the liquid. While this principle is involved in various applications of chemical mixing, one of the more critical applications is that of mixing chlorine with water for purification of swimming pool water. It is well known that swimming pool water must contain a certain level of chlorine concentration so that the water is fit for continuous bathing, and the more bathers for a given quantity of swimming pool water, the higher the chlorine concentration should be. Of course, since excessive chlorine concentration is frequently injurious to the skin and eyes of the body, extreme care must be taken to avoid placing an excessive amount of chlorine in the pool water.

Because of the importance of having the correct concentration of chlorine in a pool, it has been common practice to add dry chlorine to the water by hand. While such a procedure results in fairly accurate control of the chlorine concentration at the time the dry chlorine is added to the water, the chlorine concentration dissipates between treatments, and the chlorine is usually added to the water at one spot in the pool which results in high chlorine concentration at that spot and inadequate chlorine concentration in the remainder of the pool water, and the maintenance of adequate chlorine content in the pool water by such periodic application is subject to human frailties of memory and judgment.

Previous devices have been developed for feeding chemicals into a stream of water, as shown by U.S. Pat. No. 3,323,539, and the invention disclosed herein is an improvement thereover.

Thus, it is an object of this invention to provide a chemical feeder for mixing a soluble chemical with a liquid solute wherein the chemical is continuously mixed with the liquid at a substantially uniform rate. Other objects, features and advantages of the present invention will become apparent upon reading the following specification, when taken in conjunction with the accompanying drawing.

FIG. 1 is a vertical-sectional view of the chemical feeder.

FIG. 2 is a detailed view, with parts shown in cross section and other parts broken away of the lower portion of the tubular chemical compound container.

FIG. 3 is a cross-sectional view, taken along lines 3—3 of FIG. 2, of the chemical compound container.

FIG. 4 is a perspective view of the solidified chemical compound.

FIG. 5 is a cross-sectional view, with parts broken away, of the inlet valve of the chemical feeder.

While the invention disclosed herein is directed to a chemical feeder for mixing soluble sanitization chemicals with swimming pool water, it should be understood that the inventive concept may be applicable in the feeding of a wide variety of substances to various liquids, and that the concept should not be limited to the particular field disclosed.

Referring now more particularly to the drawing, in which like numerals indicate like parts throughout the several views, feeder 10 includes lower housing 11, upper housing 12 and connector plate 13. A lower housing 11 includes base 15, annular sidewall 16, and upper annular flange 18. While the components of lower housing 11 can be fabricated from various different materials, it is anticipated that sidewall 16 shall be of a transparent plastic material, such as "Plexiglas," so that the elements within lower housing 11 can be observed.

Base 15 of lower housing 11 includes a plurality of support legs 19 at spaced intervals about its perimeter, and each support leg 19 defines a vertical opening 20 through which connecting screws, or the like, can be inserted for supporting feeder 10. Base 15 also includes horizontal platform 21 which is spaced above the bottom of support legs 19, and which is substantially disc-shaped. Flange 22 extends downwardly from the periphery of platform 21. Outlet conduit 24 extends along the bottom surface of horizontal platform 21, with one of its ends terminating in a nipple 25 which extends through flange 22, and with the other of its ends extending up through the central portion of horizontal platform 21, and terminating in valve seat 26 and valve guide 28. Valve guide 28 defines a plurality of vertical slots 29. Upper annular flange 18 of lower housing 11 includes a plurality of spaced bosses 30, each of which defines a threaded bore 31. The upper portion 32 of flange 18 is offset inwardly from its lower portion.

Connector plate 13 includes horizontal disc-shaped dividing wall 34, and downwardly extending connecting flange 35. Flange 35 is shaped to fit about the offset upper portion 32 of annular flange 13 of lower housing 11. A plurality of bosses 36 are spaced about flange 35, at intervals corresponding to the intervals between the bosses 30 of lower housing 11. Bosses 36 define openings 37, and screws 38 are inserted through the openings of bosses 36 and threaded into the bores of bosses 30, to attach connector plate 13 to lower housing 11.

Dividing wall 34 includes a centrally located downwardly extending guide socket 40, and an upwardly extending annular support flange 41. A plurality of bosses 42 are positioned at spaced intervals about support flange 41, with each flange 44 including a threaded bore 44.

Upper housing 12 includes lower flange 45, side wall 46, upper flange 48, and cap 49. Upper flange 48 is externally threaded, while cap 49 includes downwardly extending flange 50 which is internally threaded and threadable onto flange 48. Flange 48 also includes overflow duct 51. Lower flange 45 includes a plurality spaced bosses 52 positioned at intervals thereabout corresponding to the intervals between bosses 44 of support flange 41, and each boss 52 defines opening 54 through which screws 55 are inserted and in engagement with the threads of bosses 42. As with lower housing 11, sidewall 46 can be fabricated of various materials; however, it is anticipated that sidewall 46 will be fabricated of a transparent plastic material, such as "Plexiglas," so that the interior portion of upper housing 12 can be observed. Thus, it will be understood at this point that lower housing 11 and upper housing 12 define lower receiving chamber 56 and upper chamber 58 which can be viewed from outside feeder 10.

Connector plate 13 includes upwardly extending container support flange 59 and a plurality of transfer openings 60 therethrough within the confines of flange 59 which function to allow chamber 58 of upper housing 12 to communicate with chamber 56 of lower housing 11. Chemical container 61 is inserted into and supported by container support flange 59 over openings 60. Container 61 includes inwardly tapered mounting base 62, sidewall 64, and cap 65. MOunting base 62 is inserted into container support flange 59, and supports container 61 within chamber 58. Base 62 includes annular weir 66 which defines a plurality of equally spaced openings 68 placed in substantially a horizontal plane. As is shown in FIG. 3, each opening 68 extends generally tangentially inwardly of container 61 at an angle offset counterclockwise from the center of the annular weir.

As is shown in FIG. 2, control ring 69 extends around weir 66 and includes a plurality of upwardly extending fingers 70a and 70b. Control ring 69 is positioned so that its fingers extends upwardly between openings 68 of weir 66, and fingers 70a are relatively narrow, while fingers 70b are relatively wide, so that the spaces between fingers 70a and 70b are alternatively narrow and wide. With this arrangement, when control ring 69 is rotated about weir 66, wide fingers 70b will cover alternate ones of openings 68 while narrow fingers 70a will not cover the openings. When control ring is rotated further, narrow finger 70a will also cover alternate ones of openings 68 so that all of the openings are covered. Of course, further rotation of control ring 69 results in uncovering all of openings 68.

Mounting base 62 includes an internal conduit 71 which opens through mounting base 62 at one of its ends, and terminates at its other end in an upwardly extending portion 72. Plug 74 is insertable into conduit 71 from outside mounting base 62, and is maintained adjacent mounting base 62 by strap 75 which is attached at one of its ends to plug 74, and attached at its other end to mounting base 62. While internal conduit 71 is supported from mounting base 62 at one of its ends, the upwardly extending portion 72 thereof is supported from the opposite side of mounting base 62 by support leg 76.

Stick positioning rod 80 extends upwardly from the internal opening of conduit 71, through out the height of chemical container 61. Rod 80 includes socket or nozzle portion 81 at its lower end, dam 82, and guide portion 84 which extends upwardly through a major portion of container 61. Nozzle 81 surrounds upwardly extending portion 72 of internal conduit 71, and defines a plurality of spaces openings 85. Nozzle 81 is constructed so that when it is seated on conduit 71, its openings 85 will be positioned at the level of openings 68 in weir 66. Guide 84 is tubular for convenience of construction, and dam 82 is positioned between nozzle 81 and guide 84 so as to prevent the liquid flowing though internal conduit 71 and through nozzle 81 from passing into the interior portion of guide 84. Upwardly extending chemical stick supports 87 are attached to nozzle portion 81 through horizontally extending legs. The upper ends of stick supports 87 terminate below the level of openings 68 or weir 66.

A body of solidified chemical compound, such as a compound containing chlorine, is formed into a cylindrical configuration 86 as is shown in FIG. 4, with a central opening 88 extending throughout its length. In use the cylinder of chemical compound is inserted into container 61 with rod 80 passing up through opening 88. After cylinder 86 is inserted into chemical container 61, cap 65 is inserted over the open upper end of container 61. Cap 65 comprises a disc-shaped body 89 with an outside lip 90 and an internal central guide finger 91 which is of a diameter approximately equal to the inside diameter of guide 84. Thus when properly positioned, finger 91 fits within guide 84 to immobilize the stick positioning rod 80.

Float 92 is positioned in chamber 56 of lower housing 11, and comprises internal stem 94, bottom wall 95, top wall 96, and peripheral wall 98. The top, peripheral and bottom walls are joined together at their edges, and bottom wall 95 and top wall 96 each include central apertures 99 and 100, respectively, which are connected to outwardly extending flanges 101 and 102 of internal stem 94. Bottom flange 101 extends outwardly from the annular wall 104 of stem 94, and annular wall 104 defines valve chamber 105. Valve stem 106 extends downwardly from flange 102 through valve chamber 105, and its lower portion 108 is of smaller thickness so it can be received in the opening of valve seat 26 of outlet conduit 24. Valve chamber 105 is thus defined by wall 104 and valve stem 106, and is generally annular in cross section, and receives valve stem guide 28 as float 92 is lowered in chamber 56. The opening of valve stem guide 28 is sufficient to receive valve stem 106.

Connector plate 13 includes inlet conduit 110 which extends along the bottom surface of its dividing wall 34 and through downwardly extending flange 35 where it terminates in nipple 111. The other end of conduit 110 turns upwardly and communicates with opening 112 in dividing wall 34. Valve housing 114 is connected to the upper surface of dividing wall 34 and defines U-shaped duct 115 which communicates at its entrance end with opening 112 and inlet conduit 110, and at its outlet end with slots 116 in housing 114. Slots 116 open through opposite sides of housing 114 into upper chamber 58. Valve stem 118 extends through an opening 119 in valve housing 119a. The upper end of valve stem 118 is tapered to a point to provide a surface which will seat within the outlet end of duct 115. O-ring 118a extends around the periphery of the upper end of valve stem 118 and functions to seal the upper end of the valve stem to the outlet end of duct 115. Diaphragm seal 118b extends around valve stem 118 beneath the tapered portion of the upper end of the valve stem. Seal 118b is generally disc-shaped with a central opening of a size such that the walls will grip and seal against valve stem 118 when it is positioned within the opening. The seal 118b, in a relaxed configuration, has a depressed central area. This depression causes the seal to have a return memory so that upon movement of valve stem 118 upwardly, the diaphragm seal is distorted into an unnatural configuration. Upon cessation of the driving force which moved the stem upwardly, the return memory of the diaphragm seal will cause the stem to move downwardly to its original position. The peripheral edge of the diaphragm seal lies between wall 34 and housing 114 and is held in position thereby. A rubber O-ring 113 lies adjacent the entrance end of duct 115 to seal that end to inlet conduit 110.

Lever arm 120 is pivotally connected at its upper end to the bottom surface of dividing wall 34 by a conventional pivot pin arrangement (not shown) and its lower end is shaped to engage the upper surface to float 92 and pivot about its upper end, and engage the lower end of valve stem 118, and urge valve stem 118 upwardly into closing relationship with U-shaped duct 115 of valve housing 114.

Guide stem 121 extends upwardly from flange 102 of float 92, and is received within guide socket 40 of connector plate 13. The telescoping relationships between guide stem 121 and guide socket 40, and between valve guide 28 and valve stem 106 function to retain float 92 upright within lower chamber 56, and in an operative position.

Stand pipe or overflow duct 124 extends upwardly from dividing wall 34 and into upper chamber 58. Dividing wall 34 defines an opening (not shown) at the point of connection with stand pipe 124, so that stand pipe 124 communicates freely with lower chamber 56. Telescoping pipe 125 surrounds stand pipe 124 and includes a rack 126 along its length. Gear 128 meshes with rack 126, and stem 129 is connected to gear 128 and extends through sidewall 46, through bearing 130. Hand wheel 131 is connected to stem 129, and functions to control gear 128 from outside chamber 58. With this arrangement, hand wheel 131 may be rotated to elevate telescoping pipe 125 within chamber 58, thus raising or lowering the effective height of stand pipe 124.

Operation

When feeder 10 is to be utilized to mix a chemical with a liquid, such as chlorine with swimming pool water, a portion of the source of water for the swimming pool is diverted to inlet conduit 110 of feeder 10, and outlet conduit 24 is connected to the stream of water which is to flow into the pool. Cap 49 of upper housing 12 is removed, and cap 65 of chemical container 61 is removed. A cylinder 86 of chlorine compound is inserted into chemical container 61 so that rod 80 is positioned within opening 88 of the cylinder and the bottom surface of the cylinder 86 rests upon upwardly extending supports 87. Cap 65 is then repositioned on container 61 and cap 49 is screwed back onto the top of upper housing 12. Hand wheel 131 is then manipulated to elevate or depress telescoping pipe 125 of stand pipe 124 to an appropriate position. A portion of the water from the source of water or from the recirculating system of the pool is then passed through inlet conduit 110. The water flows through valve housing 114 and out through slots 116 into upper chamber 58. The water then begins to accumulate in upper chamber 58, and will continue to accumulate until it reaches the opening at the top of telescoping pipe 125, or until a state of equilibrium is reached within upper chamber 58. As the water rises above the level of openings 68 in weir 66, water will begin to jet through openings 68 in weir 66 and also up though internal conduit 71, its nozzle 81, and out nozzle openings 85. After the water passes through openings 68 and 85, it impinges upon the lower portion of the chemical compound 86. As is shown in FIG. 3, the water passing through openings 68 impinges on the outer annular bottom surface of compound 86 at an angle directed toward a large area of the annulus of the compound, while the water passing through openings 85 impinges upon the inner annular bottom surface of the compound at an angle directed generally radially outwardly from nozzle 81. The impingement of water against compound 86 erodes the compound at its bottom portion at a substantially uniform rate throughout the entire annular bottom surface of compound 86, and as the compound is eroded its main body portion will move downwardly within container 61 so that a new surface of chemical compound will always be present for the impingement of water.

As the level of water within upper chamber 58 rises, a head of water pressure is created within chamber 58, thus increasing the velocity at which water passes through openings 68 and 85 of weir 66 and nozzle 81, until a state of equilibrium is reached, or until the level of water reaches the upper edge of telescoping pipe 125, whereupon the water in upper chamber 58 will flow down through telescoping pipe 125 and stand pipe 124 and into lower chamber 56. Thus, the relative vertical position of stand pipe 124 and telescoping pipe 125 function to establish the head pressure of liquid in upper chamber 58, and thus the velocity at which the liquid flows through openings 68 and 85.

As the mixture of water and dissolved chlorine falls from chemical stick 86, it passes through openings 60 in dividing wall 34, and into lower chamber 56. As the chlorine solution accumulates in lower chamber 56, it lifts float 92 so that its valve stem 106 is withdrawn from valve seat 26, and the solution passes through outlet conduit 24 and to the pool. If the passage of water from upper chamber 58 to lower chamber 56 is faster than the outlet of the solution from lower chamber 56 through outlet conduit 24, float 92 will lift the lever arm 120 which will pivot about its upper end and engage valve stem 118 to partially close U-shaped duct 115 and inlet conduit 110. Thus, the flow of liquid through the inlet conduit will be regulated according to the level of solution in lower chamber 56. In this manner, upper chamber 58 will not flood with an over abundant flow of liquid through the inlet conduit. Also, if the supply of water through inlet conduit 110 is not sufficient to maintain a liquid level within lower chamber 56, float 92 functions to close exhaust conduit 24. Thus, when exhaust conduit 24 is connected to the inlet of a pump, the suction of the pump will not function to draw air through the system and possibly create an air lock or vapor lock within the pump. In addition, if outlet conduit 24 should become blocked, thus, stopping the flow of liquid therethrough, float 92 would rise within chamber 56 until lever 120 drives the valve stem 118 into a closed relationship with duct 115, thus, stopping the inflow of liquid into the apparatus.

Control ring 69 of chemical container 61 is adjustable about weir 66 so that all the openings 68 open and water passes through all the openings and impinges on chemical compound 86; however, when it is desired to reduce the flow of liquid into chemical container 61, as when reducing the concentration of chlorine within the pool water, control ring 69 may be rotated so that it blocks alternate ones of openings 68, thus, cutting the flow through weir 66 in half, or it blocks all the openings 68, thus, stopping the flow through weir 66 but permitting flow through internal conduit 71 and nozzle 81. Furthermore, plug 74 can be inserted into internal conduit 71 to shut off the flow of water through nozzle 81. Thus, the rate of erosion of chemical compound 86 and the concentration of chlorine in the pool water can be controlled by the position of control ring 69 with respect to weir 66, by inserting plug 74 in internal conduit 71, and by elevating or lowering telescoping pipe 125 of stand pipe 124 to raise or lower the pressure head of the water passing through openings 68 and 85.

The arrangement of weir 66 and its control ring 69 are such that several openings 68 may be created in weir 66 so that a large quantity of water can be passed through weir 66. Control ring 69 is adjustable to block alternate ones of openings 68 to significantly cut down the quantity of water passing through weir 66. Furthermore, the addition of internal conduit 71 and its nozzle 81 is such that an additional quantity of water impinges upon the upside surface of chemical compound 86. Thus, it should be apparent that feeder 10 is useable with small swimming pools that are used only by a small number of people and require only a low chlorine concentration, and is also useable with large pools used by a large number of people and which require a high chlorine concentration. By manipulating control ring 69, plug 74 and telescoping pipe 125, virtually any chlorine concentration up to a safe maximum can be obtained for substantially any quantity of water.

While the invention has been disclosed as including a single chemical container 61, it will be apparent that several containers 61 can be utilized in a single upper chamber 58 without significantly modifying the remaining elements of the invention. Furthermore, the diameter of chemical container 61 can be varied, to accommodate larger cylinders of chemical compound 86. The number and area of openings 68 and 85 can be varied, as desired, to achieve the proper flow of water through weir 66 and nozzle 81. The size of inlet conduit 110 and outlet conduit 124 can be varied as desired, as can be the various connecting bosses, float and valve arrangement of the invention.

It will be obvious to those skilled in the art that many variations may be made in the embodiments chosen for the purpose of illustrating the present invention without departing from the scope thereof as defined by the appended claims.

We claim:
1. A chemical feeding apparatus for dissolving soluble chemical compositions in a liquid solute comprising an upper chamber constructed and arranged to receive a soluble chemical composition and having a liquid inlet defined therein, a lower receiving chamber constructed and arranged to receive a solution of liquid and dissolved chemical compound from the upper chamber and having a liquid outlet defined therein, and a valving means within the upper and lower chambers for regulating the flow of liquid through the inlet into the upper chamber in response to the level of liquid in the lower chamber.

2. The chemical feeding apparatus of claim 1 wherein the valving means includes a valve in the liquid inlet, a valve in the liquid outlet, and a float in the lower chamber constructed and arranged to proportionately open and close the liquid inlet valve and liquid outlet valve in response to the level of liquid in the lower chamber.

3. The chemical feeding apparatus of claim 1 including a chemical compound container in the upper chamber, said container defining at least one passageway in its lower end for directing a stream of liquid from the upper chamber against a chemical compound within the container.

4. The chemical feeding apparatus of claim 3 wherein the lower receiving chamber defines at least one transfer opening in its upper surface for transferring a solution of liquid and dissolved chemical compound from the chemical compound container to the lower chamber.

5. The chemical feeding apparatus of claim 3 wherein the chemical compound container includes an internal conduit which communicates at one end with the upper chamber and has an opposite end which terminates in a central positioned nozzle, said nozzle defining at least one nozzle passageway for directing a stream of liquid against the surface of a chemical compound within the container.

6. The chemical feeding apparatus of claim 3 wherein the chemical compound container includes a variably positionable valve for regulating the volume of liquid flowing through the jet.

7. The chemical feeding apparatus of claim 3 wherein the passageway within the chemical compound container is constructed and arranged to direct a jet of liquid toward the chemical compound in the container in an angular direction with respect to the chemical compound.

8. Method of feeding chemicals into a body of liquid comprising withdrawing a portion of the body of liquid, passing the portion through an inlet passageway of a chemical feeding apparatus and into contact with a dissolvable chemical compound in an upper chamber of the apparatus, transferring the solution containing dissolved chemical compound to a lower chamber from which the solution is discharged to be passed back into the body of water, and regulating the flow of the portion of liquid into the upper chamber in response to the level of liquid in the lower chamber.